United States Patent
Jhang et al.

(10) Patent No.: US 11,321,958 B2
(45) Date of Patent: May 3, 2022

(54) ELECTRONIC DEVICE AND FINGERPRINT SENSING CONTROL METHOD THEREOF

(71) Applicant: Novatek Microelectronics Corp., Hsinchu (TW)

(72) Inventors: Cho-Hsuan Jhang, Hsinchu (TW); Shih-Cheng Chen, Taichung (TW); Su-Wei Lien, Hsinchu (TW); Chih-Peng Hsia, Hsinchu County (TW); Shiang-Fei Wang, Tainan (TW)

(73) Assignee: Novatek Microelectronics Corp., Hsinchu (TW)

( * ) Notice: Subject to any disclaimer, the term of this patent is extended or adjusted under 35 U.S.C. 154(b) by 221 days.

(21) Appl. No.: 16/726,834

(22) Filed: Dec. 25, 2019

(65) Prior Publication Data

US 2020/0210668 A1 Jul. 2, 2020

Related U.S. Application Data

(63) Continuation-in-part of application No. 16/726,250, filed on Dec. 24, 2019, now Pat. No. 11,093,080.

(Continued)

(51) Int. Cl.
*G06K 9/00* (2022.01)
*G06F 3/044* (2006.01)
(Continued)

(52) U.S. Cl.
CPC ........ *G06V 40/1306* (2022.01); *G06F 3/0412* (2013.01); *G06F 3/0446* (2019.05); *G06F 3/0447* (2019.05)

(58) Field of Classification Search
CPC ............... G06K 9/002; G06K 9/00013; G06K 9/00087; G06K 9/00006; G06F 3/0446;

(Continued)

(56) References Cited

U.S. PATENT DOCUMENTS

| 8,942,937 B2 | 1/2015 | Miyamoto et al. |
| 9,454,271 B2 | 9/2016 | Miyamoto et al. |

(Continued)

FOREIGN PATENT DOCUMENTS

| CN | 104850292 | 8/2015 |
| TW | 201504874 | 2/2015 |
| TW | 201525826 | 7/2015 |

OTHER PUBLICATIONS

"Office Action of Taiwan Counterpart Application", dated Dec. 3, 2020, p. 1-p. 16.

(Continued)

*Primary Examiner* — Dong Hui Liang
(74) *Attorney, Agent, or Firm* — JCIPRNET

(57) ABSTRACT

An electronic device and a fingerprint sensing control method thereof are provided. The electronic device includes a touch control circuit and a fingerprint sensing control circuit. The touch control circuit is coupled to the display panel. The touch control circuit performs touch detection on the display panel to obtain a finger press area corresponding to the finger on the display panel. The fingerprint sensing control circuit is coupled to the touch control circuit to obtain a finger press area. The fingerprint sensing control circuit is coupled to the display panel to perform a fingerprint sensing control on a display panel. The fingerprint sensing control circuit scans the finger press area on the display panel in a first direction during a first period and scans the finger press area in a second direction different from the first direction during a second period after the first period.

25 Claims, 10 Drawing Sheets

Related U.S. Application Data

(60) Provisional application No. 62/844,736, filed on May 7, 2019, provisional application No. 62/785,239, filed on Dec. 27, 2018.

(51) Int. Cl.
*G06F 3/041* (2006.01)
*G06V 40/13* (2022.01)

(58) Field of Classification Search
CPC ...... G06F 3/0488; G06F 3/0412; G06F 3/041; G06F 3/0445; G06F 3/44; G06F 3/04166; G06F 3/04886; G06F 3/0416; G06F 3/0443; G06F 21/32; G06F 2203/04808; G06F 1/1626
See application file for complete search history.

(56) References Cited

U.S. PATENT DOCUMENTS

| | | | |
|---|---|---|---|
| 9,798,435 B2 | 10/2017 | Chen et al. | |
| 9,898,136 B2 | 2/2018 | Miyamoto et al. | |
| 2005/0031175 A1* | 2/2005 | Hara | G06K 9/0002 382/124 |
| 2010/0212974 A1* | 8/2010 | Kim | G06F 3/042 178/18.03 |
| 2014/0139483 A1 | 5/2014 | Miyamoto et al. | |
| 2014/0149059 A1 | 5/2014 | Miyamoto et al. | |
| 2014/0210791 A1 | 7/2014 | Hanauer et al. | |
| 2015/0022485 A1 | 1/2015 | Chen et al. | |
| 2016/0195990 A1 | 7/2016 | Han et al. | |
| 2016/0349882 A1 | 12/2016 | Liu et al. | |
| 2016/0349923 A1 | 12/2016 | Miyamoto et al. | |
| 2017/0004798 A1 | 1/2017 | Park et al. | |
| 2017/0102793 A1* | 4/2017 | Lee | G06F 3/041661 |
| 2017/0115811 A1 | 4/2017 | Yang et al. | |
| 2018/0181244 A1* | 6/2018 | Sato | G06F 3/0412 |
| 2019/0385551 A1* | 12/2019 | Kim | G06F 3/04184 |
| 2020/0097700 A1 | 3/2020 | Lin et al. | |

OTHER PUBLICATIONS

"Office Action of Related U.S. Appl. No. 16/726,250", dated Oct. 20, 2020, pp. 1-44.
"Notice of Allowance of Counterpart U.S. Appl. No. 16/726,250", dated Mar. 12, 2021, pp. 1-15.

* cited by examiner

ELECTRONIC DEVICE AND FINGERPRINT SENSING CONTROL METHOD THEREOF

CROSS-REFERENCE TO RELATED APPLICATION

This application is a continuation-in-part application of and claims the priority benefit of a prior application Ser. No. 16/726,250, filed on Dec. 24, 2019. The prior application Ser. No. 16/726,250 claims the priority benefits of U.S. provisional application Ser. No. 62/785,239, filed on Dec. 27, 2018. This application also claims the priority benefit of U.S. provisional application Ser. No. 62/844,736, filed on May 7, 2019. The entirety of the above-mentioned patent application is hereby incorporated by reference herein and made a part of this specification.

BACKGROUND

Field of the Invention

The invention relates to an electronic device and more particularly, to a fingerprint sensing control method.

Description of Related Art

A fingerprint sensor may be placed on a display panel. Or, alternatively, the fingerprint sensor may be placed under a display panel. Or, alternatively, the fingerprint sensor may be embedded in the display panel. Thus, a part (or all) of a display region of the display panel may be served as a sensing region for sensing a fingerprint. Generally, as an area of the sensing region is increased, a degree of freedom in an operation of a user may be increased. The sensing region (the fingerprint sensor) has one or more sensing units (sensing pixels). When the user presses a finger on any direction of the sensing region of the display panel, the fingerprint sensor may sense/recognize a fingerprint of the user's finger.

Generally, a system reads sensing results of all the sensing units of the fingerprint sensor (the sensing region) through a fingerprint sensing control circuit, so as to perform fingerprint sensing. In practice, the system performs the reading operation on all the sensing units of the sensing region one by one (one row by one row) in a predetermined scanning sequence. As a size of the panel (the area of the sensing region) is increased, it needs a longer time for a global reading operation performed by the fingerprint sensing control circuit on the sensing region.

It should be noted that the contents of the section of "Description of Related Art" is used for facilitating the understanding of the invention. A part of the contents (or all of the contents) disclosed in the section of "Description of Related Art" may not pertain to the conventional technology known to the persons with ordinary skilled in the art. The contents disclosed in the section of "Description of Related Art" do not represent that the contents have been known to the persons with ordinary skilled in the art prior to the filing of this invention application.

SUMMARY

The invention provides an electronic device and a fingerprint sensing control method thereof to accelerate a fingerprint reading operation of a sensing region of a display panel.

According to an embodiment of the invention, a fingerprint sensing control method for performing a fingerprint sensing control on a display panel is provided. The fingerprint sensing control method includes: scanning a finger press area on the display panel in a first direction during a first period; and scanning the finger press area in a second direction different from the first direction during a second period after the first period.

According to an embodiment of the invention, an electronic device is provided. The electronic device includes a touch control circuit and a fingerprint sensing control circuit. The touch control circuit is coupled to the display panel. The touch control circuit is configured to perform touch detection on the display panel to obtain a finger press area corresponding to a finger on the display panel. The fingerprint sensing control circuit is coupled to the touch control circuit to obtain a finger press area. The fingerprint sensing control circuit is coupled to the display panel to perform a fingerprint sensing control on the display panel. The fingerprint sensing control circuit is configured to scan the finger press area on the display panel in a first direction during a first period and scan the finger press area in a second direction different from the first direction during a second period after the first period.

Based on the above, when the finger touches the display panel, the display panel can perform the touch detection to obtain the finger press area. The fingerprint sensing control circuit can perform the fingerprint sensing control on the display panel according to the finger press area. For example, the fingerprint sensing control circuit can scan the finger press area on the display panel for multiple times in different directions during different periods. The fingerprint sensing control circuit can skip (omit scanning) the zones other than the finger press area on the display panel to accelerate the fingerprint reading operation of the sensing region of the display panel.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
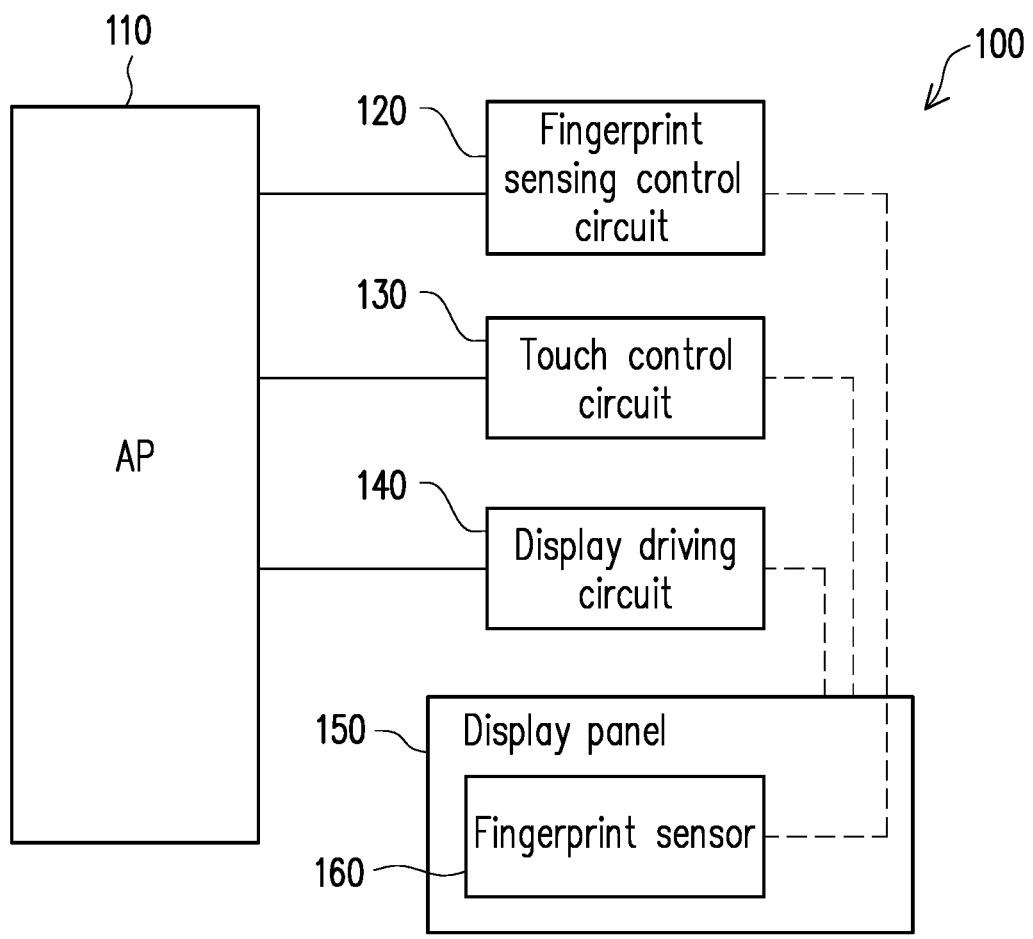
FIG. 1 is a schematic circuit block diagram illustrating an electronic device according to an embodiment of the invention.

The term "couple (or connect)" throughout the specification (including the claims) of this application are used broadly and encompass direct and indirect connection or coupling means. For example, if the disclosure describes a first apparatus being coupled (or connected) to a second apparatus, then it should be interpreted that the first apparatus can be directly connected to the second apparatus, or the first apparatus can be indirectly connected to the second apparatus through other devices or by a certain coupling means. Terms such as "first" and "second" mentioned throughout the specification (including the claims) of this application are only for naming the names of the elements or distinguishing different embodiments or scopes and are not intended to limit the upper limit or the lower limit of the number of the elements not intended to limit sequences of the elements. Moreover, elements/components/steps with same reference numerals represent same or similar parts in the drawings and embodiments. Elements/components/notations with the same reference numerals in different embodiments may be referenced to the related description.

In some embodiments, a fingerprint sensing control circuit can be configured to have a flexible scanning direction. Accordingly, the scanning operation can be focused on a finger press area by having a flexible scanning direction. For example, the fingerprint sensing control circuit can control a fingerprint sensing operation on a fingerprint sensor of the display panel according to a finger press area. The fingerprint sensing control circuit can scan the finger press area for multiple times in different directions to obtain a plurality of fingerprint frames of the same fingerprint. In some embodiments, one or more turning positions can be determined. A first turning position can indicate a position where a scanning direction can be turned from a first scanning direction to a second scanning direction. A second turning position can indicate a position where the scanning direction can be turned from the second scanning direction to the first scanning direction. In some embodiments, a fingerprint sensing control circuit can determine a position or a location to start a fingerprint scanning operation. For example, the fingerprint sensing control circuit can determine which side of a sensing region or a display panel to start a fingerprint scanning operation. In some embodiments, a fingerprint sensing control circuit can accelerate scanning (or even omit scanning) one or more zones (or any region) other than the finger press area on the display panel. In some embodiments, a fingerprint sensing control circuit can further accelerate a fingerprint reading operation by reading only the finger press area.

FIG. 1 is a schematic circuit block diagram illustrating an electronic device 100 according to an embodiment of the invention. The electronic device 100 illustrated in FIG. 1 includes a fingerprint sensing control circuit 120, a touch control circuit 130, and a display driving circuit 140. It is noted that although the fingerprint sensing control circuit 120, the touch control circuit 130, and the display driving circuit 140 are shown as different circuit blocks, a part or whole of each block can be integrated with a part or whole of the other one or two blocks. In some embodiments, part or all of the fingerprint sensing control circuit 120, the touch control circuit 130, and the display driving circuit 140 can be integrated in a single chip or separated to be different chips. The chip can be used to communicate with an application processor (AP) 110 and control a display panel 150. In some embodiments, the electronic device 100 can further include the display panel 150 to serve as a display panel module. In some embodiment, the electronic device 100 can further include the application processor (AP) 110. The electronic device 100 can may be a mobile device or other non-mobile computing device.

The AP 110 can be coupled to the display driving circuit 140 to provide an image frame. The display driving circuit 140 can be coupled (directly or indirectly connected) to the display panel 150. The display driving circuit 140 may drive/control the display panel 150 to display an image in a display region of the display panel 150. For example, the display panel 150 can include a display gate on array (GOA) circuit (now shown) and the display driving circuit 140 can communicate with the GOA circuit to control the display panel 150.

The display panel 150 can include a touch detector (not shown). For example, the display panel 150 can be a touch display panel. The touch control circuit 130 is coupled to control the touch detector of the display panel 150. The touch control circuit 130 may perform touch detection on the display panel 150 to obtain a touched area (e.g., a finger press area) corresponding to an object on the display panel 150. The finger press area can mean the touched area or an area determined according to the touched area, for example, at least one target fingerprint zone covering the touched area. In the same or alternative embodiments, the touch control circuit 130 may obtain the touched area of the object on the display panel 150. The AP 110 is coupled to the touch control circuit 130 to receive a touch detection result. In some embodiments, the AP 110 may obtain the finger press area corresponding to the object on the display panel 150.

The display panel 150 can further include a fingerprint sensor 160. Based on a design requirement, the fingerprint sensor 160 may be an optical fingerprint sensor or other types of fingerprint sensors such as a capacitive fingerprint sensor. The fingerprint sensor 160 may be placed under the display panel 150. Alternatively, the fingerprint sensor 160 may be embedded in the display panel 150. Implementation details of the display panel 150 may be determined based on a design requirement. For example, the fingerprint sensor 160 may be arranged in one of an on-display configuration, an under-display configuration, a local in-display configuration and a global in-display configuration. Alternatively, the fingerprint sensor 160 may be arranged in the other configurations. Thus, a part (or all) of a display region of the display panel 150 may be served as the sensing region of the fingerprint sensor 160 for fingerprint sensing. Generally, as an area of the sensing region is increased, a degree of freedom in an operation of a user may be increased. The sensing region (the fingerprint sensor 160) may have one or more sensing units (sensing pixels). The sensing units can be arranged as on a same layer or different layers as a plurality of display pixels. In implements having the-same-layer structure, the sensing units and the display pixels can be arranged to be interlaced with the display pixels, for example, one or more columns of display pixels are arranged along with one or more columns of sensing units. Alternatively, the sensing units and the display pixels can be arranged to be located in different regions so as not to be interleaved with each other. When the user presses a finger on any direction of the sensing region of the display panel 150, the fingerprint sensor 160 may sense or recognize a fingerprint of the user's finger. In some embodiments, the AP 110 is coupled to the fingerprint sensing control circuit 120.

The fingerprint sensing control circuit 120 can be coupled (directly or indirectly connected) to control the fingerprint sensor 160 of the display panel 150 to perform a fingerprint sensing control on the display panel 150 and read a sensing signal. The finger sensing control circuit 120 can have a control circuit for controlling a scanning operation on the sensing region of the display panel and a reading circuit for reading a sensing result comprising one or more sensing signals from the sensing region of the display panel. For example, the display panel 150 can include a fingerprint gate on array (GOA) circuit (now shown) and the fingerprint sensing control circuit 120 can communicate with the GOA circuit to control the fingerprint sensor 160 of the display panel 150. The AP 110 can be further coupled to the fingerprint sensing control circuit 120 to receive a sensing result (i.e., one or more sensing signals). In some embodiments, the fingerprint sensing control circuit 120 is further coupled to the touch control circuit 130 to obtain information of the finger press area. In some other embodiments, the fingerprint sensing control circuit 120 is not coupled to the touch control circuit 130, but the AP 110 may provide the information of the finger press area provided by the touch control circuit 130 to the fingerprint sensing control circuit 120.

Based on a design requirement, in some embodiments, the fingerprint sensing control circuit 120, the touch control circuit 130 and the display driving circuit 140 may be different integrated circuits. In some other embodiments, the touch control circuit 130 and the display driving circuit 140 may be integrated in a touch with display driver integration (TDDI) chip, and the fingerprint sensing control circuit 120 may be implemented in another chip. In yet other embodiments, the fingerprint sensing control circuit 120, the touch control circuit 130 and the display driving circuit 140 may be integrated in a single integrated circuit.

The fingerprint sensing control circuit 120 can be configured to have a flexible scanning direction. In other words, the scanning direction cannot be fixed so as to more efficiently perform the scanning operation. For example, the fingerprint sensing control circuit can control a fingerprint sensing operation on a fingerprint sensor of the display panel according to a finger press area. The fingerprint sensing control circuit can scan the finger press area for multiple times in different directions to obtain a plurality of fingerprint frames of the same fingerprint. In some implementations, one or more turning positions can be determined. A first turning position can indicate a position where a scanning direction of the scanning operations is turned from a first scanning direction to a second scanning direction which may be opposite to the first scanning direction. A second turning position can indicate a position where the scanning direction can be turned back, that is, from the second scanning direction to the first scanning direction. In some implementations, the first turning position may be a position of a first edge of the finger press area. Similarly, the second turning position may be a position of a second edge of the finger press area, wherein the second edge can be opposite to the first edge. However, any turning positions for changing the scanning direction can be implemented.

Figure 2:
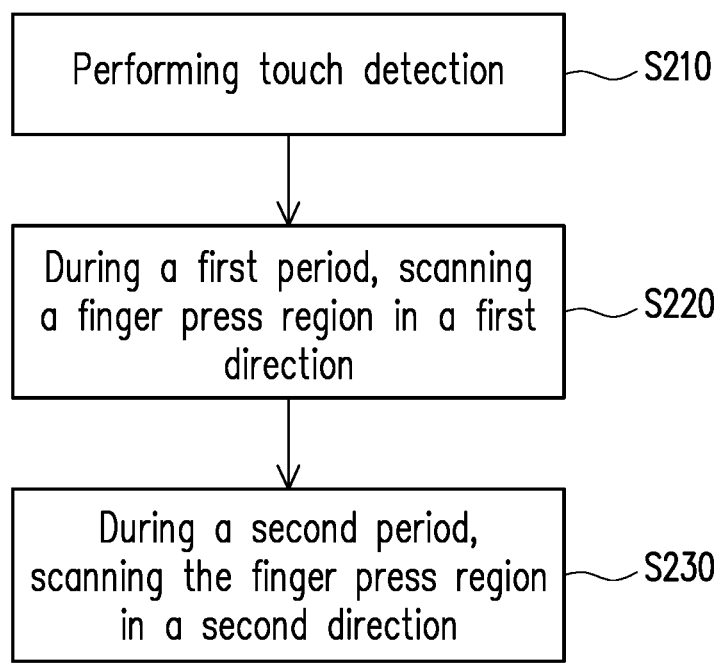
FIG. 2 is a flowchart illustrating a fingerprint sensing control method according to an embodiment of the invention.

FIG. 2 is a flowchart illustrating a fingerprint sensing control method according to an embodiment of the invention. Referring to FIG. 1 and FIG. 2, in step S210, the touch control circuit 130 performs touch detection on the display panel 150 to obtain the finger press area (which may be a touched area or an area determined according to the touched area, for example, at least one target fingerprint zone covering the touched area) corresponding to the finger on the display panel 150. During a first period, the fingerprint sensing control circuit 120 may scan the finger press area in a first direction (step S220). The scanning may be started from one side of a sensing region of the display panel and stopped at a first edge of the finger press area. In implementation where the sensing region is a whole display region of the display panel, the scanning may be started from one side of the sensing region of the display panel 150. During a second period after the first period, the fingerprint sensing control circuit 120 may scan the finger press area in a second direction different from the first direction (step S230). The scanning may be started from the first edge of the finger press area (a position) and stopped at a second edge opposite to the first edge of the finger press area (another turning position). Alternatively, different turning positions can be arranged. In some embodiments, the scanning may be started from the first edge of the finger press area (a turning position) and stopped at the side of the sensing region of the display panel 150 (another turning position). In some other embodiments, the scanning may be started from the other side of the display panel 150 (a turning position) and stopped at the side of the sensing region of the display panel 150 (another turning position). Similar steps can be continued to complete the scanning operation on the entire finger press area. For example, another step can be performed: during a third period after the second period, the fingerprint sensing control circuit 120 may scan the finger press area in the first direction (not shown). The scanning may be started from the second edge of the finger press area (a turning position) and stopped at the first edge of the finger press area (another turning position). Alternatively, different turning positions can be arranged. In some embodiments, the scanning may be started from the side of the sensing region of the display panel 150 (a turning position) and stopped at the other side of the sensing region of the display panel 150 (another). In some other embodiments, the scanning may be started from the side of the sensing region of the display panel 150 and stopped at the first edge of the finger press area. Similarly, further another step can be performed: during a fourth period after the third period, the fingerprint sensing control circuit 120 may scan the finger press area in the second direction. The scanning may be started from the first edge of the finger press area and stopped at the second edge of the finger press area. In other words, the finger press area (or a region comprising the touched area) can be scanned in different directions during different time periods. The operation can be performed to skip scanning the other area other than the finger press area of the sensing region, except in the beginning the scanning may be performed at one side of the sensing region of the display panel. Details about each still will be explained in the following embodiments.

It is noted that the embodiments in the disclosure can be performed in combination with any scanning acceleration method and/or reading acceleration method. For example, the scanning operation outside the finger press area (for example, during the first period, from the side of the sensing region where the scanning is started to the closer edge of the finger press area, i.e., the second edge), can be accelerated or even skipped. Additively or alternatively, the scanning operation outside the touched area but inside the finger press area can be also accelerated. On the other hand, the reading operation can be also accelerated, for example, by reading only sensing result from the sensing lines corresponding to the finger press area without reading any sensing result from the other sensing lines not crossing the finger press area. A diversity of acceleration methods available can be applied according to design requirements.

Figure 3A:
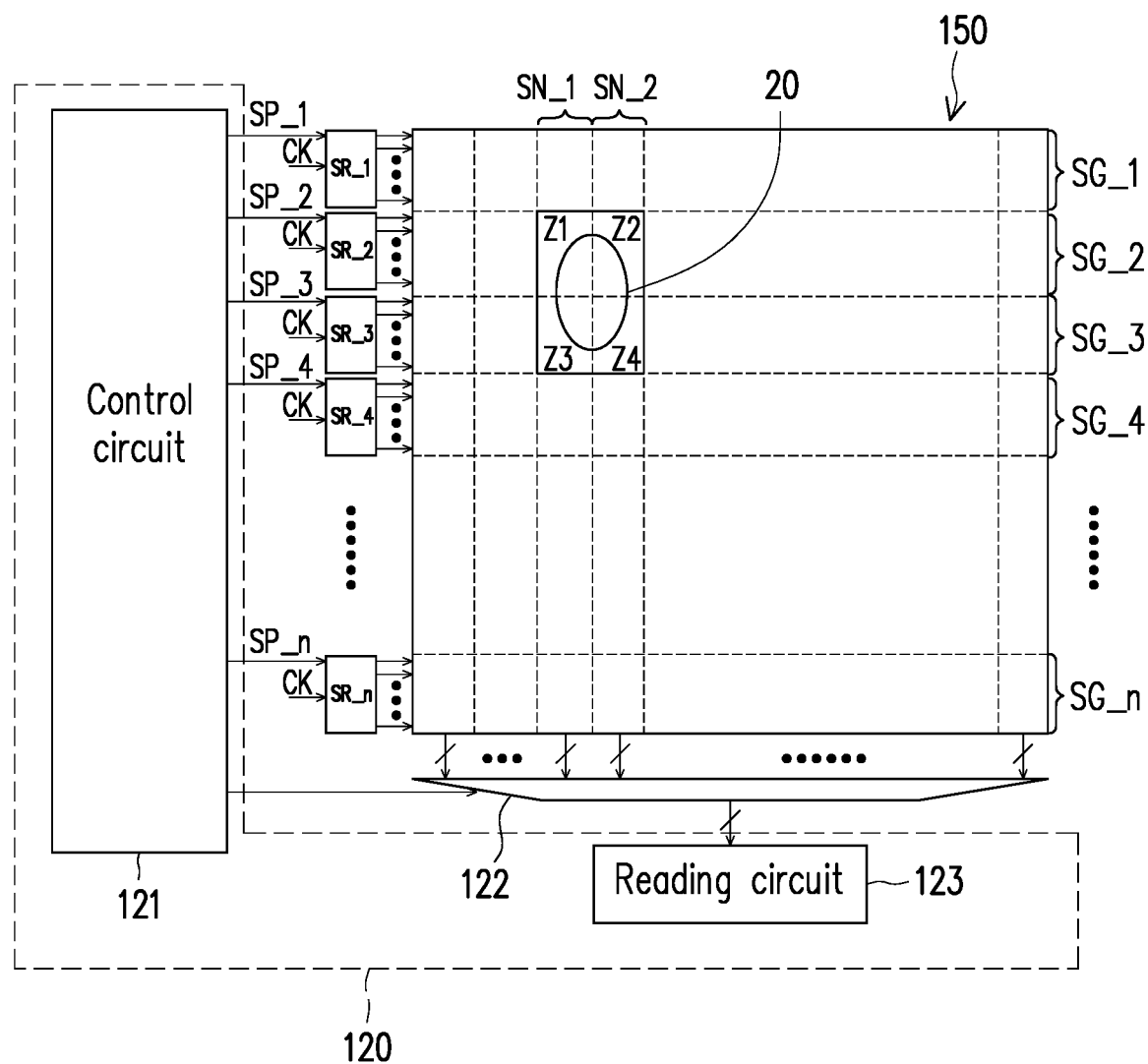
FIG. 3A is a schematic circuit block diagram illustrating the fingerprint sensing control circuit depicted in FIG. 1 according to an embodiment of the invention.

FIG. 3A is a schematic circuit block diagram illustrating the fingerprint sensing control circuit 120 depicted in FIG. 1 according to an embodiment of the invention. The display panel 150 illustrated in FIG. 3A may be inferred with reference to (but not limited thereto) the description related to the display panel 150 illustrated in FIG. 1 and thus, will not be repeated. In the example illustrated in FIG. 3A, a sensing region is exemplarily shown as a whole display region of the display panel 150. The touch control circuit 130 may perform touch detection on the display panel 150 to obtain a finger press area 20 on the display panel 150.

The sensing region may be divided into one or more fingerprint zones, which include at least one target fingerprint zone (e.g., fingerprint zones Z1, Z2, Z3 and Z4 illustrated in FIG. 3A) covering the touched area (represented as a circle) and served as the finger press area 20. However, it is noted that in other embodiments, any finger press area 20 can be defined according to the touched area in any desired manner. In such embodiments, the sensing region may not need to be divided into one or more fingerprint zones and the finger press area 20 may not need to be defined as at least one of the fingerprint zones.

Referring to FIG. 1 and FIG. 3A, based on a design requirement, in some embodiments, the display panel 150 includes one or more scanning groups such as SG_1, SG_2, SG_3, SG_4, . . . and SG_n (wherein n is an integer) in a row direction of the display panel 150, and each of the one or more scanning groups SG_1 to SG_n can include one or more scan lines.

The display panel 150 can further include one or more shift register groups, for example, shift register groups SR_1, SR_2, SR_3, SR_4, . . . and SR_n illustrated in FIG. 3A, wherein n may be an integer determined based on a design requirement. Based on a design requirement, the shift register groups SR_1 to SR_n may be integrated gate driver on array (GOA) circuits and disposed on the display panel 150. In other embodiment, the shift register groups SR_1 to SR_n may be disposed in the fingerprint sensing control circuit 120. Each of the one or more scanning groups SG_1 to SG_n can be coupled to a corresponding one of the shift register groups SR_1 to SR_n, as illustrated in FIG. 3A.

The operation of "scanning the finger press area in the first direction" may include by the fingerprint sensing control circuit 120, controlling one or more scan signals to be provided, by one or more shift register groups (e.g., SR_2 and SR_3 as shown) corresponding to the finger press area, in a first sequence to one or more target scan lines among the scan lines corresponding to the finger press area. The operation of "scanning the finger press area in the second direction" includes: by the fingerprint sensing control circuit 120, controlling the plurality of scan signals to be provided, by the one or more shift register groups (e.g., SR_2 and SR_3 as shown) corresponding to the finger press area, in a second sequence (different from the first sequence) to one or more target scan lines among the scan lines corresponding to the finger press area.

In some implementations, the fingerprint sensing control circuit 120 further includes a control circuit 121. The shift register groups SR_1 to SR_n receive corresponding start pulse signals SP_1, SP_2, SP_3, SP_4, . . . and SP_n from the control circuit 121. The GOA circuit may generate or receive a clock signal CK which may trigger the shift register groups SR_1 to SR_n to generate scanning signals for scanning the sensing region. Implementation details of the shift register groups SR_1 to SR_n are not limited in the present embodiment. Based on a design requirement, in some embodiments, any one of the shift register groups SR_1 to SR_n may be a conventional shifting register or other shift register circuits.

Taking FIG. 3A for example, in the operation of "scanning the finger press area in the first direction" in a first period, the control circuit 121 may control the shifter register groups SR_1, SR_2, and SR_3 to provide the scanning signals in the first sequence (e.g., from top to bottom) to scanning groups such as SG_1, SG_2, SG_3, which include providing scanning signals to scanning groups SG_2 and SG_3 corresponding to the finger press area. Similarly, in the operation of "scanning the finger press area in the second direction" in a second period later than the first period, the control circuit 121 may control the shifter register groups SR_3 and SR_2 to provide the scanning signals in the second sequence (e.g., from bottom to top) to scanning groups such as SG_3 and SG_3 corresponding to the finger press area.

As explained according to the embodiment of FIG. 2, similarly, in the operation of "scanning the finger press area in the first direction" in a third period after the second period, the control circuit 121 may control the shifter register groups SR_2, and SR_3 to provide the scanning signals in the first sequence (e.g., from top to bottom) to scanning groups such as SG_2 and SG_3 corresponding to the finger press area. Similarly, in the operation of "scanning the finger press area in the second direction" in a fourth period later than the third period, the control circuit 121 may control the shifter register groups SR_3 and SR_2 to provide the scanning signals in the second sequence (e.g., from bottom to top) to scanning groups such as SG_3 and SG_3 corresponding to the finger press area.

In some specific implementations, the operation of "scanning the finger press area in the first direction" in a first period may include: by the control circuit 121, controlling the plurality of start pulses SP_1 to SP_3 to be provided in the first sequence to at least one shift register group SR_1, SR_2 and SR_3. This operation can include: by the control circuit 121, controlling the plurality of start pulses SP_2 to SP_3 to be provided in the first sequence to the shift register groups SR_2 and SR_3 corresponding to the target scan lines among the scan lines corresponding to the finger press area 20. Taking FIG. 3A, for example, the control circuit 121 provides the start pulse SP_2 and the start pulse SP_3 in the first sequence (e.g., from top to bottom) to the target shift register groups SR_2 and SR_3 corresponding to the finger press area 20. Similarly, the operation of "scanning the finger press area in the second direction" in the second period includes: by the control circuit 121, controlling the plurality of start pulses SP_3 to SP_2 to be provided in the second sequence to at least one target shift register group corresponding to the target scan lines among the scan lines corresponding to the finger press area 20. Taking FIG. 3A for example, the control circuit 121 provides the start pulse P_3 and the start pulse SP_2 in the second sequence (e.g., from bottom to top) to the target shift register groups SR_3 and SR_2 corresponding to the finger press area 20.

In the embodiment illustrated in FIG. 3A, the display panel 150 can further include a multiplexer circuit 122, and the fingerprint sensing control circuit 120 further includes a fingerprint reading circuit 123. The display panel 150 includes one or more sensing groups extending in a column direction, for example, sensing groups SN_1 and SN_2 illustrated in FIG. 3A. Each of the sensing groups includes one or more sensing lines. The multiplexer circuit 122 is coupled to the sensing groups of the fingerprint zones of the display panel 150. The fingerprint reading circuit 123 is coupled to the multiplexer circuit 122. Based on a design requirement, the multiplexer circuit 122 may be disposed on the display panel 150. In other embodiment, the multiplexer circuit 122 may be disposed in the fingerprint sensing control circuit 120.

The fingerprint reading circuit 123 may read sensing signals (fingerprint sensing results) of the finger press area 20 from the target fingerprint zones Z1, Z2, Z3 and Z4 and skip reading fingerprint zones other than the target fingerprint zones Z1, Z2, Z3 and Z4 among the fingerprint zones of the display panel 150. The "skipping reading" includes: not reading any sensing signal from the other fingerprint zones that are skipped.

The fingerprint sensing control circuit 120 may perform an "accelerated reading operation". The accelerated reading operation includes: reading one or more sensing signals from the finger press area 20; and skipping scanning zones other than the finger press area 20. The skipping scanning includes not reading any sensing signal from the other zones that are skipped. For example, the control circuit 121 may control the multiplexer circuit 122 to turn on one or more signal paths from the target sensing groups SN_1 and SN_2 of the finger press area 20 to the fingerprint reading circuit 123 and turn off one or more signal paths from the sensing groups other than the target sensing groups SN_1 and SN_2 among the sensing groups to the fingerprint reading circuit 123.

Figure 3B:
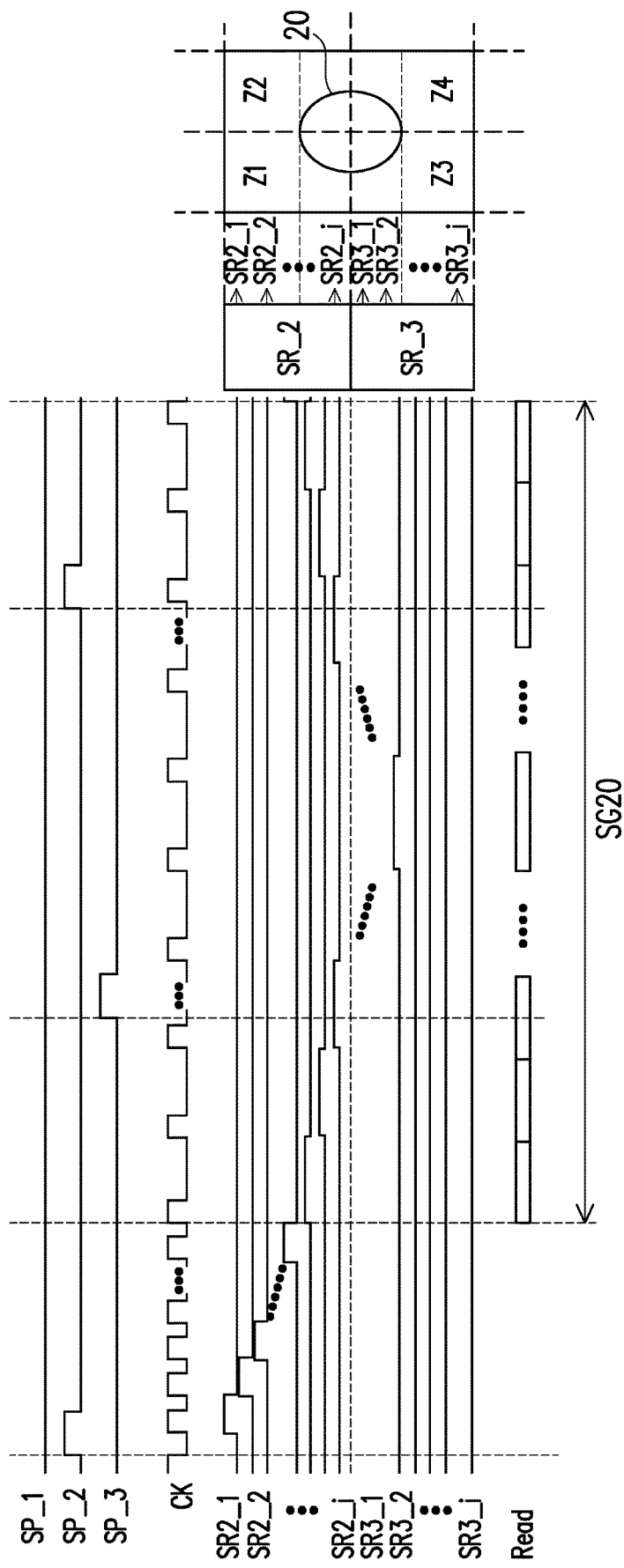
FIG. 3B is a schematic signal timing diagram of the fingerprint sensing control circuit according to an embodiment of the invention.

FIG. 3B is a schematic signal timing diagram of the fingerprint sensing control circuit 120 according to an embodiment of the invention. The embodiment of FIG. 3B can be applied to (but not limited thereto) the embodiment of FIG. 3A. The touched area 20, the target fingerprint zones Z1 to Z4, the shift register group SR_2 and the shift register group SR_3 illustrated in FIG. 3A are particularly shown on the right side in FIG. 3B. Referring to FIG. 3A and FIG. 3B, according to the start pulse signal SP_2 and the clock signal CK, the shift register group SR_2 may output scanning signals SR_1, SR_2, . . . and SR_i to the scanning group SG_2, wherein i may be an integer determined based on a design requirement. According to the start pulse signal SP_3 and the clock signal CK, the shift register group SR_3 may output scanning signals SR3_1, SR3_2, . . . , SR3_i to the scanning group SG_3.

In some embodiments, the control circuit 121 may obtain information (including the direction and/or the area size) of the touched area 20 from the touch control circuit 130. In some other embodiments, the control circuit 121 may obtain the information of the touched area 20 from the AP 110. The control circuit 121 may obtain the information of the touched area 20 to perform an accelerated scanning operation. In the embodiment illustrated in FIG. 3B, the operation of the "accelerated scanning operation" includes: by the control circuit 121, skipping the scanning of the other scanning groups SG_1 and SG_4 to SG_n that are not coupled to the target fingerprint zones Z1, Z2, Z3 and Z4. The operation of "skipping" includes not transmitting any scanning signal to the one or more scanning groups SG_1 and SG_4 to SG_n. For example, according to the information of the touched area 20, the control circuit 121 applies a pulse to the start pulse signals SP_2 and SP_3 of the target shift register groups SR_2 and SR_3 and does not apply the pulse to the start pulse signals SP_1 and SP_4 to SP_n of the other shift register groups SR_1 and SR_4 to SR_n. Namely, the start pulse is provided to trigger the target shift register groups SR_2 and SR_3 corresponding to the target scanning groups SG_2 and SG_3, and the start pulse is not provided, so as not to trigger the shift register groups SR_1 and SR_4 to SR_n corresponding to the one or more scanning groups SG_1 and SG_4 to SG_n that are not coupled to the target fingerprint zones Z1, Z2, Z3 and Z4.

In the embodiment illustrated in FIG. 3B, the control circuit 121 may set a scanning speed for a target scan period SG20 corresponding to the touched area 20 to a first speed and set a scanning speed for a scan period other than the target scanning period SG20 to a second speed (wherein the second speed is greater than the first speed). For example, the control circuit 121 may set the clock signal CK to have a first frequency in the target scanning period SG20 and set the clock signal CK to have a second frequency in the scan period other than the target scanning period SG20 (wherein the second frequency is higher than the first frequency).

The control circuit 121 can control the shift direction of the shift register groups SR_1 to SR_n from top to bottom (the first direction) or from bottom to top (the second direction). According to the start pulse signal SP_2 and the clock signal CK, the shift register group SR_2 may out output the plurality of scan signals to the plurality of scan lines of the fingerprint sensor 160 of the display panel 150. During the target scanning period SG20, the control circuit 121 may set the clock signal CK to have the first frequency (a normal frequency) and control the shift direction of the shift register groups SR_1 to SR_n to be in the first direction. Thus, according to the start pulse signal SP_2, the shift register group SR_2 continues to scan the scan lines of the fingerprint sensor 160 in the scanning group SG_2 in the first direction (from a first edge of the finger press area 20 to a second edge of the finger press area 20). According to the start pulse signal SP_3, the shift register group SR_3 continues to scan the scan lines of the fingerprint sensor 160 in the scanning group SG_3 in the first direction.

After the finger press area 20 ends, the control circuit 121 may obtain a fingerprint frame of the finger press area 20. The control circuit 121 may control the shift direction of the shift register groups SR_1 to SR_n to be in the second direction (from the second edge of the finger press area 20 to the first edge of the finger press area 20). Thus, the shift register group SR_3 continues to scan the scan lines of the fingerprint sensor 160 in the scanning group SG_3 in the second direction. According to the start pulse signal SP_2, the shift register group SR_2 continues to scan the scan lines of the fingerprint sensor 160 in the scanning group SG_2 in the second direction.

Figure 4:
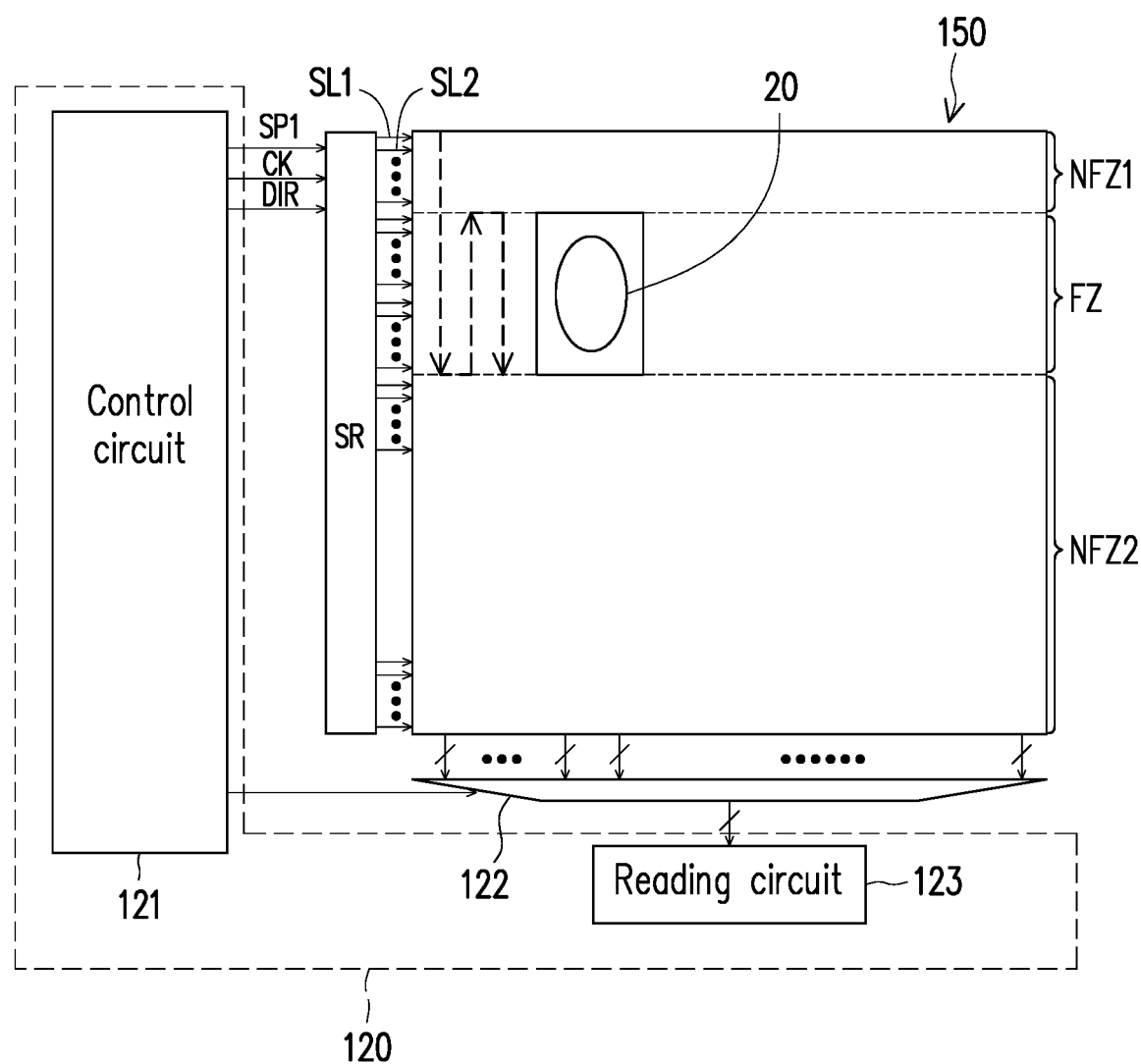
FIG. 4 is a schematic circuit block diagram illustrating the fingerprint sensing control circuit depicted in FIG. 1 according to another embodiment of the invention.

FIG. 4 is a schematic circuit block diagram illustrating the fingerprint sensing control circuit 120 depicted in FIG. 1 according to another embodiment of the invention. The fingerprint sensing control circuit 120, the multiplexer circuit 122 and the display panel 150 illustrated in FIG. 4 may be inferred with reference to the description related to the fingerprint sensing control circuit 120, the multiplexer circuit 122 and the display panel 150 illustrated in FIG. 3A and thus, will not be repeated.

Referring to FIG. 4, the display panel 150 includes a shift register group SR. Based on a design requirement, the shift register groups SR may be integrated GOA circuits and disposed on the display panel 150. In other embodiments, the shift register group SR may be disposed in the fingerprint sensing control circuit 120. The shift register group SR can receives the start pulse signal SP1 from the control circuit 124. The clock signal CK may trigger the shift register group SR. One or more output terminals of the shift register group SR are coupled to one or more scan lines SL_1, SL_2 . . . of the fingerprint sensor 160 of the display panel 150. Implementation details of the shift register group SR are not limited in the present embodiment. Based on a design requirement, in some embodiments, the shift register group SR may be a conventional shifting register or other shift register circuits. Under the control of a control signal DIR, the shift direction of the shift register group SR can be performed in different directions, which may include a first direction (e.g., from top to bottom) and a second direction (e.g., from bottom to top). The detailed operation of FIG. 4 may be analogized based on the descriptions of the embodiments of FIG. 5A to FIG. 7 and omitted here for brevity.

Figure 5A:
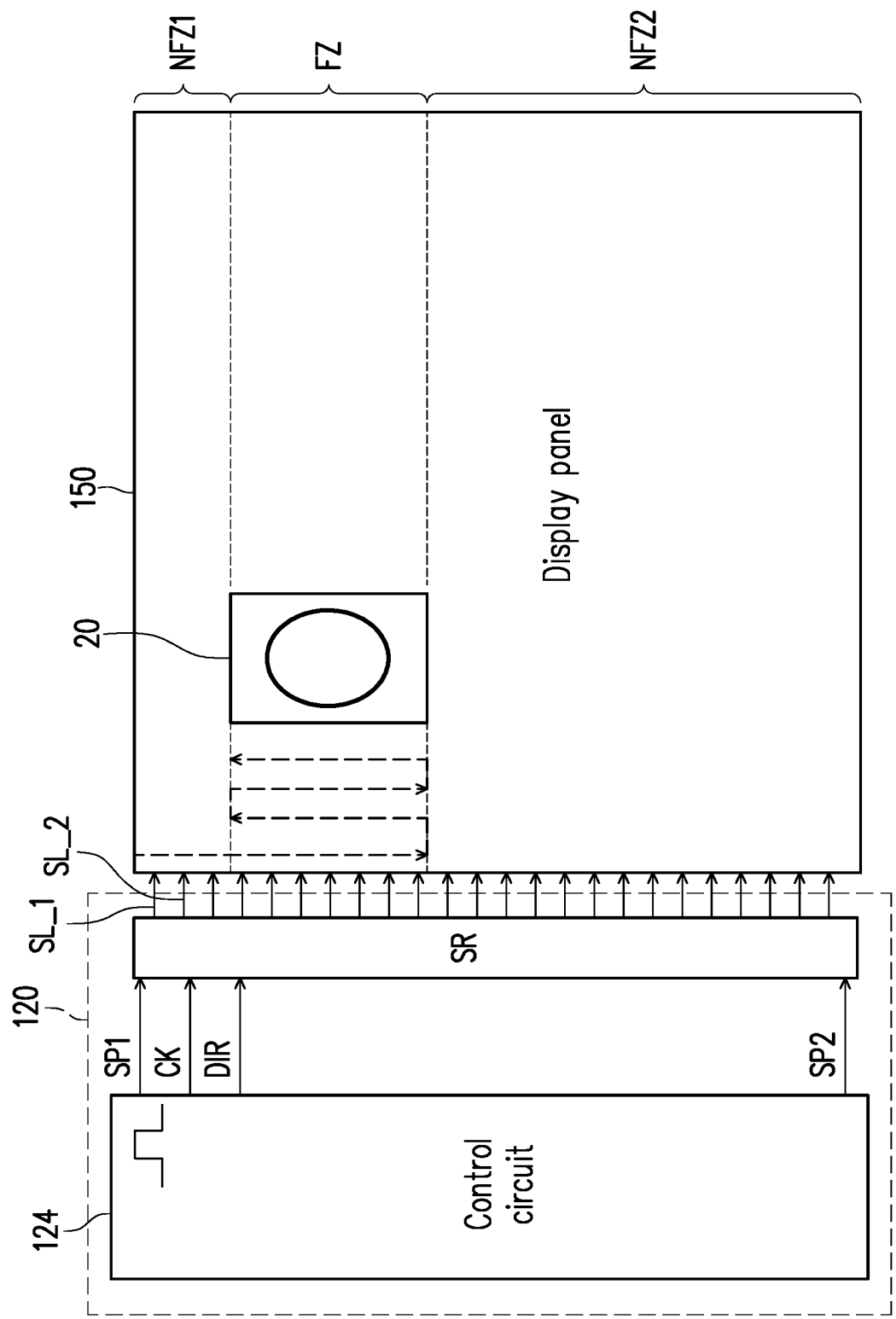
FIG. 5A and FIG. 5B are schematic circuit block diagrams illustrating scanning operation performed by the fingerprint sensing control circuit according to another embodiment of the invention.
Figure 5B:
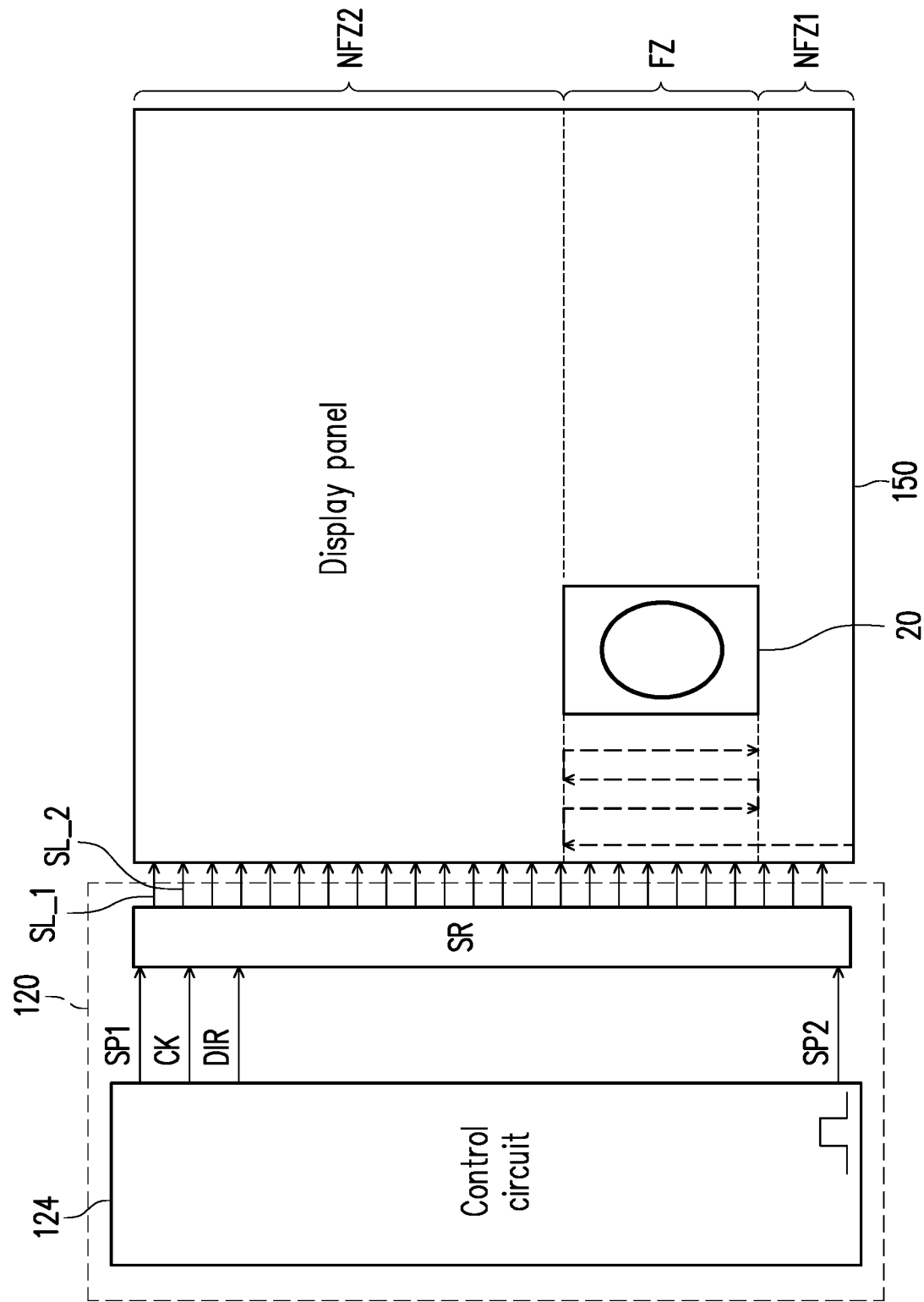

FIG. 5A and FIG. 5B are schematic circuit block diagrams illustrating scanning operation performed by the fingerprint sensing control circuit 120 depicted in FIG. 1 according to another embodiment of the invention. FIGS. 5A and 5B differs from each other mainly in that the finger press area 20 is closer to an upper edge of the display panel 150 in FIG. 5A and the finger press area 20 is closer to a lower edge of the display panel 150 in FIG. 5B. As will be explained, the difference can cause the scanning operation to be started at different positions. More specifically, the scanning operation can be arranged to be started at the upper edge of the display panel 150 in FIG. 5A and conversely, the scanning operation can be arranged to be started at the lower edge of the display panel 150 in FIG. 5B.

The display panel 150 illustrated in FIG. 5A and FIG. 5B may be inferred with reference to the description related to the display panel 150 illustrated in FIG. 1 and thus, will not be repeated. Referring to FIG. 1 and FIG. 5A and FIG. 5B, the fingerprint sensing control circuit 120 includes a control circuit 124 and a shift register group SR. The shift register group SR may provide a plurality of scanning signals to corresponding scanning lines SL_1, SL_2, and etc., coupled to a sensing region of the fingerprint sensor 160 of the display panel 150. Based on a design requirement, the shift register group SR may be an integrated GOA circuit and disposed on the display panel 150. The shift register group SR receives the start pulse signal SP1 or SP2 from the control circuit 124. The clock signal CK may trigger the shift register group SR to scan the sensing region of the display panel. A control signal DIR may control a shift direction of the shift register group SR. One or more output terminals of the shift register group SR are coupled to one or more scan lines of the fingerprint sensor 160 of the display panel 150. Implementation details of the shift register group SR are not limited in the present embodiment. Based on a design requirement, in some embodiments, the shift register group SR may be a conventional shifting register or other shift register circuits.

Under the control of the control signal DIR, the shift direction of the shift register group SR can be performed in different directions, which may include a first direction (e.g., from top to bottom) and a second direction (e.g., from bottom to top). For example, when the control signal DIR is in a first logic state (e.g., at a low logic level), the shift direction of the shift register group SR is the first direction (e.g., from top to bottom). Conversely, when the control signal DIR is in a second logic state (e.g., at a high logic level), the shift direction of the shift register group SR is the second direction (e.g., from bottom to top).

Referring to FIG. 5A, the control signal DIR is in the first logic state (e.g., at a low logic level), so that the shift direction of the shift register group SR is the first direction (e.g., from top to bottom). According to the start pulse signal SP1 and the clock signal CK, the shift register group SR may out output the plurality of scan signals to the plurality of scan lines of the fingerprint sensor 160 of the display panel 150.

Referring to FIG. 5B, the control signal DIR is in the second logic state (e.g., at a high logic level), so that the shift direction of the shift register group SR is the second direction (e.g., from bottom to top). According to the start pulse signal SP2 and the clock signal CK, the shift register group SR may out output the plurality of scan signals to the plurality of scan lines of the fingerprint sensor 160 of the display panel 150.

The control circuit 124 applies the start pulse to the start pulse signal SP1 in the embodiment illustrated in FIG. 5A, so as to start to scan from the upper edge of the display panel 150. Based on a design requirement, in other embodiments (referring to FIG. 5B), the control circuit 124 may apply the start pulse to the start pulse signal SP2, so as to start to scan from the lower edge of the display panel 150. By deducing analogously with reference to the descriptions related to FIG. 5A and FIG. 5B, in the embodiment of "applying the start pulse to the start pulse signal SP2, so as to start to scan from the lower edge of the display panel 150", the control circuit 124 may scan the finger press area 20 for multiple times back and forth in different directions to obtain one or more fingerprint frames of the same fingerprint.

The control circuit 124 may determine the side from which the scanning operation is started according to which one of the two opposite sides of a sensing region of the display panel 150 is closer to the finger press area 20. For example, when a distance from the finger press area 20 to the upper edge of the display panel 150 is smaller than a distance from the finger press area 20 to the lower edge of the display panel 150, as in FIG. 5A, the control circuit 124 may apply the start pulse to the start pulse signal SP1, and set the control signal DIR to be in the first logic state (e.g., at the low logic level). Thus, the shift register group SR may start to scan from the upper edge of the display panel 150 to the finger press area 20. Otherwise, when the distance from the finger press area 20 to the upper edge of the display panel 150 is greater than the distance from the finger press area 20 to the lower edge of the display panel 150, as in FIG. 5B, the control circuit 124 may apply the start pulse to the start pulse signal SP2, and set the control signal DIR to be in the second logic state (e.g., at the high logic level). Thus, the shift register group SR may start to scan from the lower edge of the display panel 150 to the finger press area 20.

Figure 6:
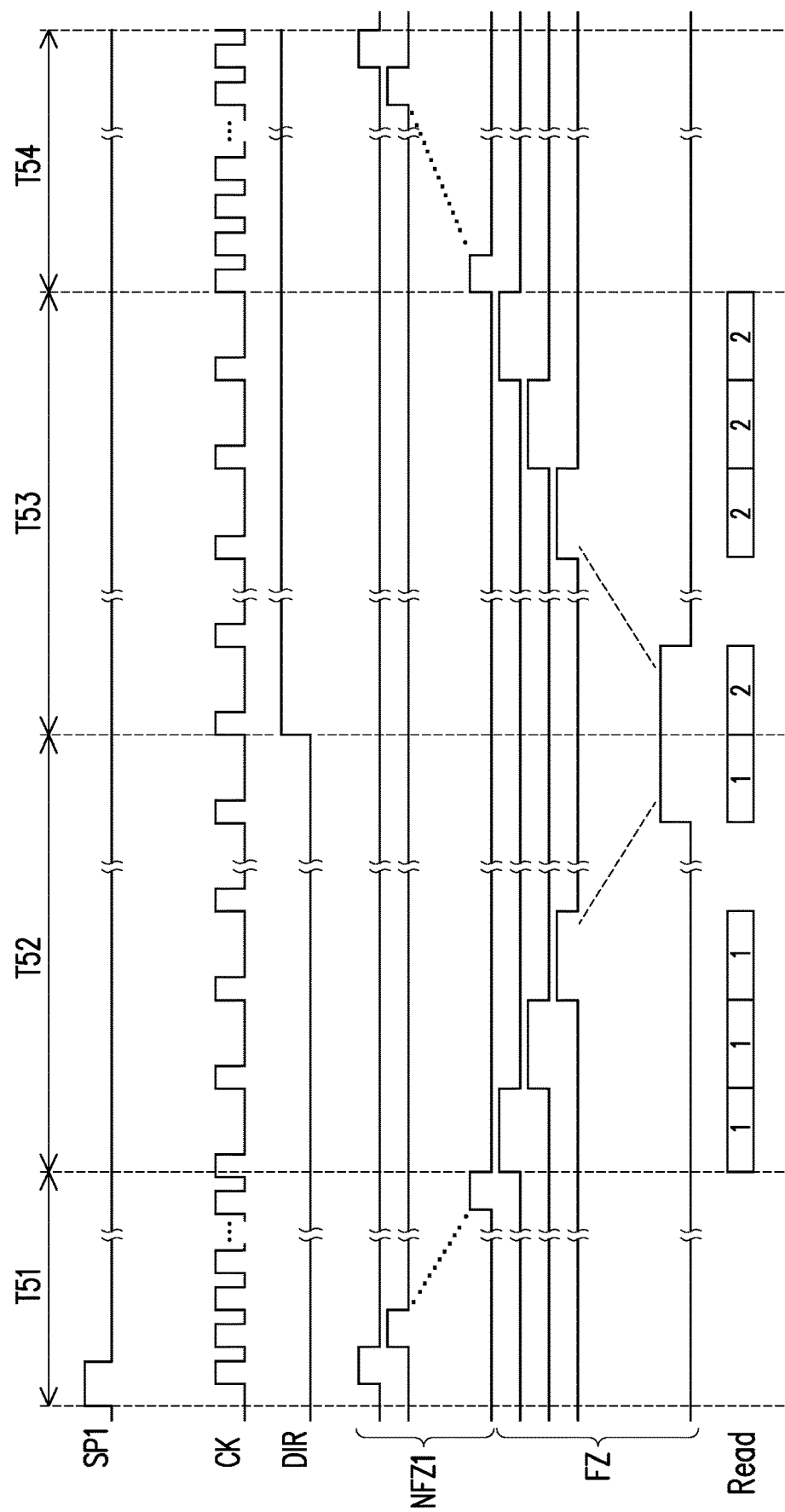
FIG. 6 is a schematic signal timing diagram of the fingerprint sensing control circuit according to an embodiment of the invention.

FIG. 6 is a schematic signal timing diagram of the fingerprint sensing control circuit 120 according to an embodiment of the invention. Referring to FIG. 5A and FIG. 6, when the control signal DIR is in a first logic state (e.g., at a low logic level), the shift direction of the shift register group SR is the first direction (e.g., from top to bottom). According to a plurality of control signals which may include the start pulse signal SP1 and the clock signal CK, the shift register group SR may out output the plurality of scan signals to the plurality of scan lines of the fingerprint sensor 160 of the display panel 150. FIG. 6 illustrates signals for scanning a non-fingerprint zone NFZ1 not covering the finger press area and signals for scanning a fingerprint zone FZ corresponding to the finger press area 20, for example, as illustrated in FIG. 5A.

In the embodiment illustrated in FIG. 6, the control circuit 124 may set a scanning speed for the fingerprint zone FZ corresponding to the finger press area 20 to a first speed and set a scanning speed for scanning zones (e.g., the non-fingerprint zone NFZ1) other than the fingerprint zone FZ to a second speed that can be greater than the first speed. For example, the control circuit 124 may set the clock signal CK in the fingerprint zone FZ to have a first frequency and set the clock signal CK in the non-fingerprint zone FZ to have a second frequency (wherein the second frequency is higher than the first frequency).

During a period T51, the control circuit 124 may set the clock signal CK to have the second frequency (a high frequency) and set the control signal DIR in the first logic state (e.g., at the low logic level). Thus, the shift register group SR may start to scan the scan lines of the fingerprint sensor 160 in the non-fingerprint zone NFZ1 in the first direction (e.g., from top to bottom) from an upper edge of the display panel 150. For the zones other than the fingerprint zone FZ (e.g., the non-fingerprint zone NFZ1), the fingerprint sensing control circuit 120 may accelerate the scanning operation to shorten a scanning time. In addition, for the zones other than the fingerprint zone FZ (e.g., the non-fingerprint zones), the fingerprint sensing control circuit 120 may further skip reading the other zones, so as to accelerate a fingerprint reading operation of the sensing region of the display panel 150. In a condition that the other zones having no fingerprint (i.e., not covered by the finger) are skipped, since transmission for invalid data is reduced, a transmission frequency bandwidth between the AP and the fingerprint sensing control circuit can effectively used.

During a period T52, the control circuit 124 may set the clock signal CK to have the first frequency (a normal frequency) and set the control signal DIR to be in the first logic state (e.g., at the low logic level). Thus, the shift register group SR continues to scan the scan lines of the fingerprint sensor 160 in the fingerprint zone FZ in the first direction (from a first edge of the finger press area 20 to a second edge of the finger press area 20). In the embodiment illustrated in FIG. 5A, the fingerprint sensing control circuit 120 may further include a fingerprint reading circuit, wherein the fingerprint reading circuit may be inferred with reference to the descriptions related to the multiplexer circuit 122 and the fingerprint reading circuit 123 illustrated in FIG. 4 and thus, will not be repeated. The fingerprint sensing control circuit 120 may perform the "accelerated reading operation". The accelerated reading operation can include: reading one or more sensing signals from the finger press area 20; and skipping scanning the zones other than the finger press area 20, wherein the skipping scanning includes not reading any sensing signal from the other zones that are skipped. After the period T52 ends, the control circuit 124 may obtain a fingerprint frame of the finger press area 20.

During a period T53, the control circuit 124 may set the clock signal CK to have the first frequency (the normal frequency) and switch the control signal DIR to be in a second logic state (e.g., at a high logic level). Thus, the shift register group SR may change to scan the scan lines of the fingerprint sensor 160 in the fingerprint zone FZ in the second direction (from the second edge of the finger press area 20 to the first edge of the finger press area 20, for example, from bottom to top). In the embodiment illustrated in FIG. 6, the control circuit 124 may skip scanning the zones other than the finger press area 20 (e.g., a non-fingerprint zone NFZ2). After the period T53 ends, the control circuit 124 may obtain another fingerprint frame of the finger press area 20.

By deducing analogously, the control circuit 124 may scan the fingerprint zone FZ for multiple times back and forth in different directions to obtain one or more fingerprint frames of the same fingerprint. For example, during a period after the period T53 (which is referred to as a third period hereinafter and not illustrated in FIG. 6), the fingerprint sensing control circuit 120 may scan the finger press area 20 on the display panel 150 in the first direction (an operation during the third period is similar to the operation during the period T52). During a period after the third period (which is referred to as a fourth period hereinafter and not illustrated in FIG. 6), the finger press area 20 is canned in the second direction (an operation during the fourth period is similar to the operation during the period T53). The number of the scanning operation performed for multiple times (i.e., the number of rounds that the fingerprint zone FZ is scanned back and forth) may be determined based on a size of the fingerprint press area and/or a design requirement. It is assumed that in the embodiment illustrated in FIG. 6, obtaining two fingerprint frames for the same fingerprint may satisfy the design requirement.

During a period T54, the control circuit 124 may set the clock signal CK to have the second frequency (the high frequency) and set the control signal DIR to be in the second logic state (e.g., at the high logic level). Thus, the shift register group SR still scans the scan lines of the fingerprint sensor 160 in the non-fingerprint zone NFZ1 in the second direction (from the finger press area 20 to the upper edge of the finger press area 150, i.e., from bottom to top). When the scanning performed by the shift register group SR arrives the upper edge of the display panel 150, the period T54 can end.

In other embodiments, when the period T53 ends, the control circuit 124 may reset the shift register group SR. In such embodiment, the period T54 may be omitted, thereby accelerating the scanning operation.

Figure 7:
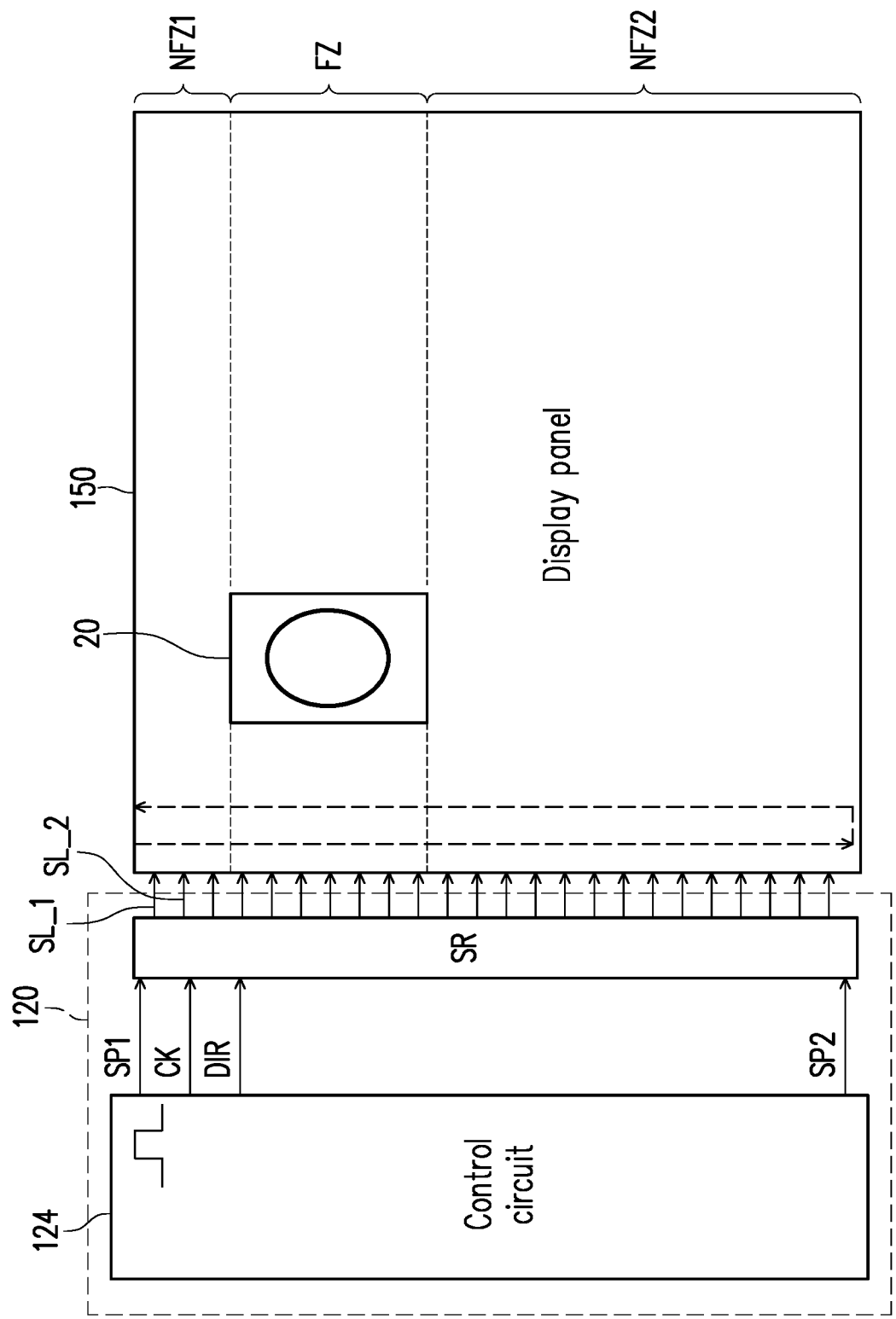
FIG. 7 is schematic circuit block diagram illustrating scanning operation performed by the fingerprint sensing control circuit according to another embodiment of the invention.

FIG. 7 is a schematic circuit block diagram illustrating scanning operation performed by the fingerprint sensing control circuit 120 depicted in FIG. 1 according to another embodiment of the invention. The display panel 150 illustrated in FIG. 7 may be inferred with reference to the description related to the display panel 150 illustrated in FIG. 1 and thus, will not be repeated. FIG. 7 differs from FIG. 5A mainly in that an accelerated scanning is performed in the non-fingerprint zones NFZ2 in FIG. 7 but no scanning is performed (i.e., the scanning is skipped) in the non-fingerprint zones NFZ2 in FIG. 5A.

Figure 8:
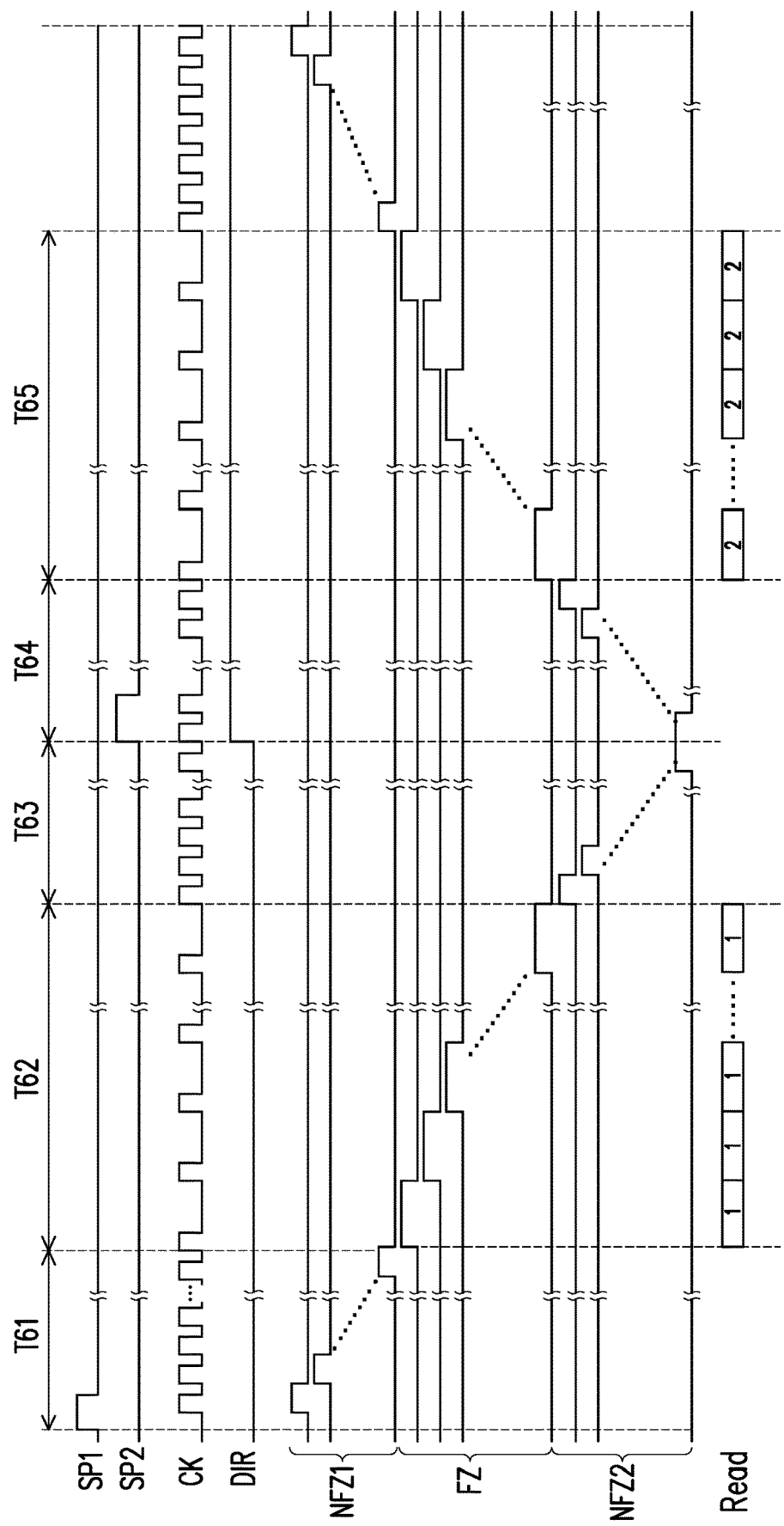
FIG. 8 is a schematic signal timing diagram of the fingerprint sensing control circuit according to another embodiment of the invention.

FIG. 8 is a schematic signal timing diagram of the fingerprint sensing control circuit 120 according to another embodiment of the invention. FIG. 8 illustrates signals for scanning the non-fingerprint zones NFZ1 and NFZ2 not covering the finger press area and signals for scanning the fingerprint zone FZ covering the finger press area 20, for example, as illustrated in FIG. 7.

In the embodiment illustrated in FIG. 8, the control circuit 124 may set the scanning speed for the fingerprint zone FZ corresponding to the finger press area 20 to a first speed and set the scanning speed for the scanning zones other than the fingerprint zone FZ (i.e., the non-fingerprint zones NFZ1 and NFZ2) to a second speed that is greater than the first speed. For example, the control circuit 124 may set a clock signal CK in the fingerprint zone FZ to have the first frequency and set the clock signal CK in the non-fingerprint zones NFZ1 and NFZ2 to have the second frequency that is higher than the first frequency. Details about the operation in the periods T61 and T62 illustrated in FIG. 8 may be inferred with reference to the descriptions related to the periods T51 and T52 illustrated in FIG. 6 and thus, will not be repeated.

Compared to FIG. 6, there are two periods T63 and T64 of FIG. 8 additionally inserted between periods T52 and T53 (corresponding to T62 and T65). This insertion is arranged because the non-fingerprint zone NFZ2 is scanned rather than skipped. Moreover, the additional scanning for the non-fingerprint zone NFZ1 may be performed more quickly, for example, by increasing the frequency of the clock signal. More specifically, referring to FIG. 7 and FIG. 8, after the period T62 ends, the control circuit 124 may obtain a fingerprint frame of the finger press area 20. During a period T63, the control circuit 124 may set the clock signal CK to have the second frequency (the high frequency) and maintain the control signal DIR in the first logic state (e.g., at the low logic level). Thus, the shift register group SR can till scan the scan lines of the fingerprint sensor 160 in the non-fingerprint zone NFZ2 in the first direction (from a lower side of the finger press area 20 to a lower edge of the sensing region of the display panel 150, i.e., from top to bottom). When the scanning performed by the shift register group SR arrives the lower edge of the sensing region of the display panel 150, the period T63 can end.

During a period T64, the control circuit 124 may still maintain the clock signal CK to have the second frequency (the high frequency) and switch the control signal DIR to be in the second logic state (e.g., at the high logic level). Thus, the shift register group SR may change to scan the scan lines of the fingerprint sensor 160 in the non-fingerprint zone NFZ2 in the second direction (from the lower edge of the display panel 150 to the finger press area 20, example, i.e., from bottom to top). When the scanning operation performed by the shift register group SR arrives the edge of the finger press area 20, the period T64 can end.

For the zones other than the fingerprint zone FZ (i.e., the non-fingerprint zones NFZ1 and NFZ2), the fingerprint sensing control circuit 120 may accelerate the scanning operation to shorten the scanning time. In addition, for the zones other than the finger press area 20 (e.g., the non-fingerprint zones), the fingerprint sensing control circuit 120 may further skip reading the other zones, so as to accelerate the fingerprint reading operation of the sensing region of the display panel 150. In a condition that the other zones having no fingerprint (i.e., not covered by the finger) are skipped, since transmission for invalid data is reduced, a transmission frequency bandwidth between the AP and the fingerprint sensing control circuit can effectively used.

During a period T65, the control circuit 124 may set the clock signal CK to have the first frequency (the normal frequency) and set the control signal DIR to be in the second logic state (e.g., at the high logic level). Thus, the shift register group SR may continue to scan the scan lines of the fingerprint sensor 160 in the fingerprint zone FZ in the second direction (from the second edge of the finger press area 20 to the first edge of the finger press area 20, for example, from bottom to top). After the period T65 ends, the control circuit 124 may obtain another fingerprint frame of the finger press area 20. The period T65 illustrated in FIG. 8 may be inferred with reference to the description related to the period T53 illustrated in FIG. 6.

By deducing analogously, the control circuit 124 may scan the sensing region of the fingerprint sensor 160 for multiple times back and forth in different directions in to obtain one or more fingerprint frames of the same fingerprint. The number of the scanning operation performed for multiple times (i.e., the number of rounds that the fingerprint zone FZ is scanned back and forth) may be determined according to a size of the finger press area and/or based on a design requirement. It is assumed that obtaining two fingerprint frames may satisfy the design requirement in the embodiment illustrated in FIG. 8.

In alternative embodiments, the scanning operation for the non-fingerprint zone NFZ2 may not be performed (i.e., skipped), by changing a scanning direction of the scanning operation at an edge of the fingerprint zone FZ (the turning position) adjacent to the non-fingerprint zone NFZ2. In more other embodiments, the turning position where scanning direction changes can be arranged at any position, for example, located between the edge of the fingerprint zone FZ and one side (e.g. the lower side for FIG. 5A) of the display panel 150.

In addition, the scanning operation for the non-fingerprint zones NFZ1 and NFZ2 can be also skipped, as shown in FIG. 5A and FIG. 6; or alternatively, the scanning operation for the non-fingerprint zones NFZ1 and NFZ2 can be also accelerated (i.e., performed with a higher speed), as shown in FIG. 7 and FIG. 8. Any different variations can be made in more other embodiments to have the scanning operation performed more efficiently.

It is noted that the clock signal CK in the embodiment can mean one or more clock signals. More specifically, the clock signal can be implemented as the same clock signal having an adjustable clock frequency, or alternatively, the clock signal can mean different clock signal having different clock frequencies.

Based on different design demands, the blocks of the AP 110, the fingerprint sensing control circuit 120 and (or) the touch control circuit 130 may be implemented in a form of hardware, firmware, software (i.e., programs) or in a combination of many of the aforementioned three forms.

In terms of the hardware form, the blocks of the AP 110, the fingerprint sensing control circuit 120 and (or) the touch control circuit 130 may be implemented in a logic circuit on the integrated circuit. Related functions of the AP 110, the fingerprint sensing control circuit 120 and (or) the touch control circuit 130 may be implemented in a form of hardware by utilizing hardware description languages (e.g., Verilog HDL or VHDL) or other suitable programming languages. For example, the related functions of the AP 110, the fingerprint sensing control circuit 120 and (or) the touch control circuit 130 may be implemented in one or more controllers, micro-controllers, microprocessors, application-specific integrated circuits (ASICs), digital signal processors (DSPs), field programmable gate arrays (FPGAs) and/or various logic blocks, modules and circuits in other processing units.

In terms of the software form and/or the firmware form, the related functions of the AP 110, the fingerprint sensing control circuit 120 and (or) the touch control circuit 130 may be implemented as programming codes. For example, the AP 110, the fingerprint sensing control circuit 120 and (or) the touch control circuit 130 may be implemented by using general programming languages (e.g., C or C++) or other suitable programming languages. The programming codes may be recorded/stored in recording media, and the aforementioned recording media include, for example, a read only memory (ROM), a storage device and/or a random access memory (RAM). The programming codes may be accessed from the recording medium and executed by a computer, a central processing unit (CPU), a controller, a micro-controller or a microprocessor to accomplish the related functions. As for the recording medium, a "non-transitory computer readable medium", such as a tape, a disk, a card, a semiconductor memory or a programming logic circuit, may be used. In addition, the programs may be provided to the computer (or the CPU) through any transmission medium (e.g., a communication network or radio waves). The communication network is, for example, the Internet, wired communication, wireless communication or other communication media.

Based on the above, when the finger touches the display panel, the display panel can perform the touch detection to obtain the finger press area. The fingerprint sensing control circuit can perform the fingerprint sensing control on the fingerprint sensor of the display panel according to the finger press area. For example, the fingerprint sensing control circuit can scan the finger press area on the display panel for multiple times in different directions during different periods to obtain the plurality of fingerprint frames of the same fingerprint. The fingerprint sensing control circuit can accelerate scanning (and/or even omit scanning) one or more zones or any area other than the finger press area on the display panel. Moreover, the fingerprint sensing control circuit can further accelerate the fingerprint reading operation by reading sensing signals from only the finger press area the sensing region of the display panel and/or by skipping reading sensing signals form a region other than the finger press area.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A fingerprint sensing control method, for performing a fingerprint sensing control on a display panel, the fingerprint sensing control method comprising:
   scanning a finger press area on the display panel in a first direction from a first edge of the finger press area to a second edge of the finger press area during a first period;
   scanning the finger press area in a second direction from the second edge of the finger press area to the first edge of the finger press area during a second period after the first period; and
   determining the first edge of the finger press area according to a distance from the finger press area to two opposite sides of a sensing region of the display panel.

2. The fingerprint sensing control method according to claim 1, wherein the display panel comprises one or more scanning groups in a row direction of the display panel, and each of the one or more scanning groups comprises one or more scan lines, wherein
   the operation of scanning the finger press area on the display panel in the first direction comprises:
      controlling one or more scan signals to be provided in a first sequence to one or more target scan lines among the scan lines corresponding to the finger press area, and
   the operation of scanning the finger press area on the display panel in the second direction comprises:
      controlling one or more scan signals to be provided in a second sequence to the target scan lines.

3. The fingerprint sensing control method according to claim 2, wherein each of the one or more scanning groups is coupled to a corresponding one of one or more shift register groups,
   the operation of scanning the finger press area on the display panel in the first direction comprises:
      controlling one or more start pulses to be provided in a first sequence to at least one target shift register group corresponding to the target scan lines among the scan lines corresponding to the finger press area, and
   the operation of scanning the finger press area on the display panel in the second direction comprises:
      controlling one or more start pulses to be provided in a second sequence to the at least one target shift register group corresponding to the target scan lines among the scan lines corresponding to the finger press area.

4. The fingerprint sensing control method according to claim 1, wherein the first edge and the second edge are two opposite edges of the finger press area.

5. The fingerprint sensing control method according to claim 4, wherein the scanning in the first direction is started from the first edge of the finger press area and ended at the second edge of the finger press area, and the scanning in the second direction is started from the second edge of the finger press area and ended at the first edge of the finger press area.

6. The fingerprint sensing control method according to claim 1, further comprising:
   scanning from a first side of a sensing region of the display panel to the finger press area in the first direction before the first period.

7. The fingerprint sensing control method according to claim 6, further comprising:
   determining the first side as one of two opposite sides of the sensing region of the display panel according to which one of the two opposite sides is closer to the finger press area.

8. The fingerprint sensing control method according to claim 1, further comprising performing an accelerated reading operation, wherein the accelerated reading operation comprises:
   reading one or more sensing signals from the finger press area; and
   skipping scanning at least one another area other than the finger press area, wherein the skipping reading comprises not reading any sensing signal from the at least one another area that is skipped.

9. The fingerprint sensing control method according to claim 8, wherein the display panel comprises one or more sensing groups extending in a column direction, each of the sensing groups comprises one or more sensing lines, and the operation of reading the sensing signals from the finger press area comprises:
   turning on, by a multiplex circuit, one or more signal paths from at least one target sensing group coupled to the finger press area to a fingerprint reading circuit; and
   skipping reading at least one another area other than the finger press area, wherein the skipping reading comprises:
      turning off, by the multiplex circuit, one or more signal paths from the sensing groups other than the at least one target sensing group among the sensing groups to the fingerprint reading circuit.

10. The fingerprint sensing control method according to claim 1, further comprising:
    performing touch detection on the display panel to obtain the finger press area corresponding to a finger on the display panel.

11. The fingerprint sensing control method according to claim 1, further comprising:
    scanning the finger press area on the display panel in the first direction during a third period after the second period; and scanning the finger press area in the second direction during a fourth period after the third period.

12. The fingerprint sensing control method according to claim 1, further comprising:
    setting a scanning speed for scanning in the finger press area to a first speed; and
    setting a scanning speed for another area other than the finger press area to a second speed, wherein the second speed is higher than the first speed.

13. The fingerprint sensing control method according to claim 1, further comprising:
    skipping scanning at least one another area other than the finger press area.

14. An electronic device, comprising:
    a touch control circuit, coupled to a display panel, and configured to perform touch detection on the display panel to obtain a finger press area corresponding to a finger on the display panel; and
    a fingerprint sensing control circuit, coupled to the touch control circuit to obtain the finger press area, and coupled to the display panel to perform a fingerprint sensing control on the display panel, wherein
    the fingerprint sensing control circuit is configured to scan the finger press area on the display panel in a first direction from a first edge of the finger press area to a second edge of the finger press area during a first period, scan the finger press area in a second direction from the second edge of the finger press area to the first edge of the finger press area during a second period after the first period, and determine the first edge of the finger press area according to a distance from the finger press area to two opposite sides of a sensing region of the display panel.

15. The electronic device according to claim 14, wherein the display panel comprises one or more scanning groups in a row direction of the display panel, and each of the one or more scanning groups comprises one or more scan lines, wherein
    the operation of scanning the finger press area on the display panel in the first direction comprises:
        controlling one or more scan signals to be provided in a first sequence to one or more target scan lines among the scan lines corresponding to the finger press area, and
    the operation of scanning the finger press area on the display panel in the second direction comprises:
        controlling one or more scan signals to be provided in a second sequence to the target scan lines.

16. The electronic device according to claim 15, wherein each of the one or more scanning groups is coupled to a corresponding one of one or more shift register groups,
    the operation of scanning the finger press area on the display panel in the first direction comprises:
        controlling one or more start pulses to be provided in a first sequence to at least one target shift register group corresponding to the target scan lines among the scan lines corresponding to the finger press area, and
    the operation of scanning the finger press area on the display panel in the second direction comprises:
        controlling one or more start pulses to be provided in a second sequence to the at least one target shift register group corresponding to the target scan lines among the scan lines corresponding to the finger press area.

17. The electronic device according to claim 14, wherein the first direction is from a first edge of the finger press area towards a second edge of the finger press area, wherein the first edge and the second edge are two opposite edges of the finger press area.

18. The electronic device according to claim 17, wherein the scanning in the first direction is started from the first edge of the finger press area and ended at the second edge of the finger press area, and the scanning in the second direction is started at the second edge of the finger press area and ended at the second edge of the finger press area.

19. The electronic device according to claim 14, wherein
    the fingerprint sensing control circuit scans from a first side of a sensing region of the display panel to the finger press area in the first direction before the first period.

20. The electronic device according to claim 19, wherein the fingerprint sensing control circuit determines the first side as one of two opposite sides of the sensing region of the display panel according to which one of the two opposite sides is closer to the finger press area.

21. The electronic device according to claim 14, wherein the fingerprint sensing control circuit performs an accelerated reading operation, wherein the accelerated reading operation comprises:
    reading one or more sensing signals from the finger press area; and
    skipping scanning at least one another area other than the finger press area, wherein the skipping scanning comprises not reading any sensing signal from the at least one another area that is skipped.

22. The electronic device according to claim 21, wherein the display panel comprises one or more sensing groups extending in a column direction, each of the sensing groups comprises one or more sensing lines, and the operation of reading the sensing signals from the finger press area comprises:
    turning on, by a multiplex circuit, one or more signal paths from at least one target sensing group coupled to the finger press area to a fingerprint reading circuit; and
    skipping reading at least one another area other than the finger press area, wherein the skipping reading comprises:
        turning off, by the multiplex circuit, one or more signal paths from the sensing groups other than the at least one target sensing group among the sensing groups to the fingerprint reading circuit.

23. The electronic device according to claim 14, wherein
    the fingerprint sensing control circuit scans the finger press area on the display panel in the first direction during a third period after the second period, and
    the fingerprint sensing control circuit scans the finger press area in the second direction during a fourth period after the third period.

24. The electronic device according to claim 14, wherein
    the fingerprint recognition circuit sets a scanning speed for scanning in the finger press area to a first speed, and
    the fingerprint recognition circuit sets a scanning speed for another area other than the finger press area to a second speed, wherein the second speed is higher than the first speed.

25. The electronic device according to claim 14, wherein the fingerprint sensing control circuit skips scanning at least one another area other than the finger press area.

* * * * *